April 8, 1930.  W. V. D. KELLEY  1,753,379
COLOR PHOTOGRAPHY
Filed Nov 9, 1925
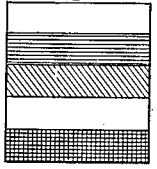
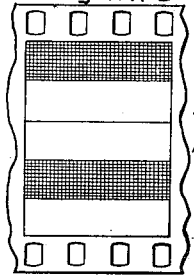
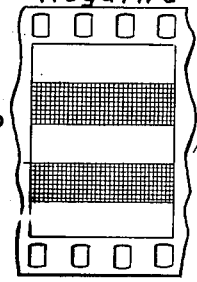
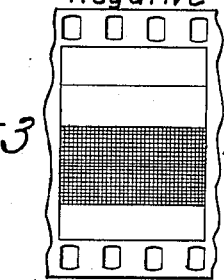
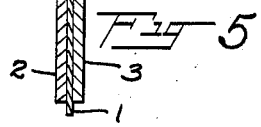
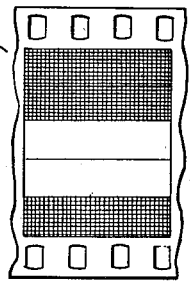
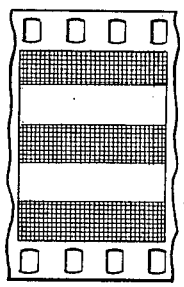
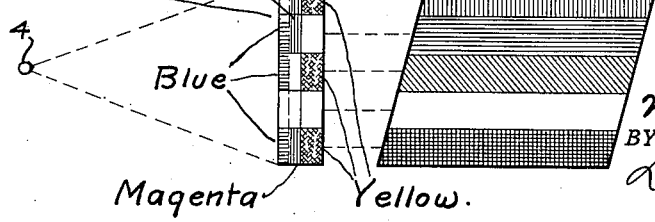
INVENTOR
William V. D. Kelley
BY Lyman E. Dodge
ATTORNEY Patented Apr. 8, 1930

1,753,379

UNITED STATES PATENT OFFICE

WILLIAM V. D. KELLEY, OF JERSEY CITY, NEW JERSEY

COLOR PHOTOGRAPHY

Application filed November 9, 1925. Serial No. 67,734.

This invention relates to photography, particularly to color photography and more especially to color photography involving more than two colors.

A principal object of this invention is to provide a process by which at least three colors of an object are represented by colored superimposed images in the same picture space, in two coatings, one on one side of a carrier and one on the other.

Other objects and advantages will appear as the description of a particular manipulation involving the novel features of applicant's invention progresses and the novel features will be particularly pointed out in the appended claims.

In describing the invention in detail and particular specific applications of the invention selected for the purpose of illustrating the principle of the invention, reference will be had to the accompanying schematic drawings and the characters of reference thereon designating like parts in the several views, and in which:

Figure 1 is a schematic illustration of a colored subject; Fig. 2, is a red color selection negative made of Fig. 1; Fig. 3 is a blue color selection negative made of Fig. 1; Fig. 4 is a green color selection negative made of Fig. 1; Fig. 5, is a cross sectional view of double coated film stock; Fig. 6 is a print made by using negative Fig. 2; Fig. 7, is a print made using negative Fig. 3; Fig. 8 is a print made using negative Fig. 4; Fig. 9, is a schematic view illustrating the effect obtained by transmitted light with a completed print.

In order to carry out applicant's process it will be necessary to secure three images, one representative of one color in a subject, one representative of another color in the subject and the third representative of a third color of the subject. These images must be suitable for use as negatives and in the further description of the process will be referred to as negatives. One will be designated the red color selection negative, one the blue color selection negative and the other the green color selection negative. There are many ways of securing these negatives well known to those skilled in this art and as applicant's process does not depend upon the particular methods used for securing the negatives no particular manner of securing them will be described and pointed out.

As illustrated by Fig. 1, the subject selected to illustrate the invention is colored, red, blue, green, white and black in the specific areas as shown.

Figs. 2, 3 and 4, illustrate red, blue and green color selection negatives, made in well known ways of the subject Fig. 1.

Fig. 5, illustrates a cross section of a double coated transparent carrier, in which 1 is the carrier and 2 and 3 light sensitive gelatine emulsion coatings placed one on one side of the carrier and the other on the other side of the carrier. One side being designated obverse and the other reverse.

In carrying out my process I first form an image in one coating, say the obverse coating using the red color selection negative. This print is made in well known ways in such manner that the developable light sensitive material in this coating is not exhausted and the light sensitive material in the reverse coating is not substantially affected.

After printing I then develop in a neutral or acid diamidophenol bath made up as follows:

| | | |
|---|---|---|
| Diamidophenol | 5 | grams |
| Sodium sulphite | 30 | grams |
| Potassium bromide | 0.94 | gram |
| Potassium iodide 10% solution | 1.2 | ccs. |
| Water | 1 | liter |

This developing would give a print, Fig. 6.

After developing, the print should be washed for 5 minutes, then the print should be placed on the blue color forming bath. A satisfactory color-forming bath to develop a blue in the image is formed as follows:

| | | |
|---|---|---|
| Nitric acid | 3 | ccs. |
| Ferric and ammonium oxalate | 14 | grams |
| Potassium ferricyanide | 5 | grams |
| Water | 1 | liter |

The print should be allowed to remain in the blue color forming bath for about 15 minutes and then washed for five minutes.

After the print has been washed it should be cleared, that is all light sensitive material which may have been affected by the previous treatment should be converted into such form that it cannot be again developed without a subsequent exposure. Applicant allows the clearing bath to act for about ten minutes and finds that a suitable clearing bath would be as follows:

| | | |
|---|---|---|
| Ammonium bromide | 12 | grams |
| Potassium bichromate | 12 | grams |
| Water | 2 | liters |

Although applicant finds the previously mentioned clearing bath efficacious he may also use another bath and finds it quite suitable. This bath would be as follows:

| | | |
|---|---|---|
| Ammonium bromide | 15 | grams |
| Potassium metabisulphite | 0.75 | gram |
| Water | 1 | liter |

After the print has been cleared it should be washed for ten minutes and dried. This drying must of course take place in the dark, or in a room illuminated by a light having no effect upon the light sensitive material in the emulsion, that is, in most cases a ruby light.

After the print has been dried, I again print images in the emulsions. This time I place the blue selection negative in contact with the reverse side of the carrier and the green selection negative in contact with the obverse side, that is the side which carries the blue image. The printing is done using the ordinary precautions and manipulation known for such a situation.

After printing the print is developed as before in a neutral or acid diamidophenol, using the bath herein before given, and then washed.

The next step is to bleach. This is accomplished by the following bath:

| | | |
|---|---|---|
| Chromic acid | 4 | grams |
| Cupric sulphate | 40 | grams |
| Potassium bromide | 32 | grams |
| Water | 4 | liters |

The bleaching bath is allowed to act for about 10 minutes, then the print is washed and fixed in an acid sodium thiosulphate bath and then washed.

The bleaching bath used has the property of so acting on the gelatine that the gelatine surrounding the light sensitive material exposed, developed and bleached will absorb and hold dyes.

The side printed with the green color selection negative, Fig. 4, is dyed magenta in well known ways.

The side printed with the blue color selection negative Fig. 3 is dyed yellow in well known ways.

Dyes suitable for the purpose are naphtol yellow, acid magenta and patent blue of the nitro or azo group of color dyes.

It is of course understood that in applying the dyes well known methods are used by which the selected dye comes only in contact with the selected coating to be dyed.

After the dyeing the print will appear as shown by the cross section A, Fig. 9, which shows by appropriate cross hatching the several colored images.

If light from a source 4, Fig. 9 is allowed to shine upon the film A, then the effect upon the screen 5 will be as shown and indicated by the cross hatching to indicate color. The resultant color on the screen may be derived by observing that the process of projection is a subtractive one. White light from the source passing through section 6 will have the green absorbed passing through the magenta and the blue absorbed passing through the yellow so that only the red will be transmitted and appear on the screen 5. In section 7, the blue absorbs red and the magenta the green so that only blue is transmitted. In section 8, the blue likewise absorbs the red and the yellow absorbs blue and only green is transmitted. In section 9 no coloring occurs so that all colors are transmitted and white appears on the screen. In section 10, blue absorbs red, magenta absorbs green and yellow absorbs blue so that no light is transmitted and the section on the screen corresponding appears black.

Instead of the dyeing system above described I may use the Kodachrome system utilizing the process in which the dye is absorbed by the soft gelatine.

I may also tone, directly after development and fixing the last two images printed onto the carrier by a toning bath as follows:

| | |
|---|---|
| Ammonium metavanadate | 1 gram |
| Oxalic acid | 2 grams |

The above are boiled fifteen minutes.

| | |
|---|---|
| Oxalic acid | 15 grams |
| Potassium ferricyanide | 15 grams |
| Water to make | 1 liter |

After washing I would then have a blue on the obverse side and a yellow on the reverse side. In order to get a magenta in addition to the blue on the obverse side I would then treat the obverse side with the following, which is a basic dye:

| | |
|---|---|
| Fuchsine crystals | 2.5 grams |
| Chrysoidine Y | 10.0 grams |
| Glacial acetic acid | 10.0 ccs. |
| Water | 4.0 liters |

After treatment by this bath and washing the print would be substantially colored as shown by Fig. 9.

Although I have particularly described the construction and method of forming one physical embodiment of my invention and explained the operation and principle thereof and of my process used for the production thereof, nevertheless, I desire to have it understood that the form selected is merely illustrative, but does not exhaust the possible physical embodiments of the idea of means underlying my invention or the extent of the applicability of my process.

What I claim as new and desire to secure by Letters Patent of the United States, is:

1. A photographic process which consists in forming a latent image in a light sensitized coating on one side of a transparent carrier, developing in acid diamidophenol, toning with an iron salt to a blue color and, after clearing with an aqueous bath of ammonium bromide and potassium bichromate, forming an image in the same coating and an image in a like coating on the other side of the transparent carrier and coloring said last formed images, one a magenta and the other a yellow, while preventing the coloring matter for one image from coming in contact with the other image.

2. The method of producing three images in two light sensitive layers one on either side of a transparent carrier and coloring each a different color, which consists in first forming a toned image of one color in one layer and after clearing, forming an image in each layer and differently coloring, while preventing the coloring matter for one image from coming in contact with the other image.

WILLIAM V. D. KELLEY.